United States Patent [19]
van Erkel

[11] Patent Number: 5,407,463
[45] Date of Patent: Apr. 18, 1995

[54] RECOVERY OF CD AND NI FROM BATTERIES

[75] Inventor: Joost van Erkel, Loenen, Netherlands

[73] Assignee: Nederlandse Organisatie voor Toegepast-Natuurwetenschappelijk Onderzoek TNO, Delft, Netherlands

[21] Appl. No.: 861,865

[22] PCT Filed: Aug. 2, 1991

[86] PCT No.: PCT/EP91/01490

§ 371 Date: Oct. 14, 1992

§ 102(e) Date: Oct. 14, 1992

[87] PCT Pub. No.: WO92/03853

PCT Pub. Date: Mar. 5, 1992

[30] Foreign Application Priority Data

Aug. 15, 1990 [NL] Netherlands .................. 9001825

[51] Int. Cl.$^6$ ................................. C22B 3/44
[52] U.S. Cl. ....................... 75/739; 204/112; 204/114; 423/140; 423/150.3; 423/633
[58] Field of Search ............... 204/112, 113, 114, 115, 204/117; 75/739; 423/150.3, 140, 633

[56] References Cited

U.S. PATENT DOCUMENTS

5,120,409  6/1992  Hanulik .................. 204/112

FOREIGN PATENT DOCUMENTS

069117   1/1983   European Pat. Off. .
158626  10/1985   European Pat. Off. .
247023  11/1987   European Pat. Off. .
284135   9/1988   European Pat. Off. .
99916    8/1975   Japan ..................... 204/114

*Primary Examiner*—Melvyn J. Andrews
*Attorney, Agent, or Firm*—Rosen, Dainow & Jacobs

[57] ABSTRACT

Method for recovering cadmium (Cd), nickel (Ni) and iron (Fe) from batteries containing the steps of: (a) reducing the size of the batteries to small pieces and separating the pieces into a coarse fraction and a fine fraction with the coarse fraction further separated into a magnetic and a non-magnetic fraction; (b) leaching out the fraction at approximately 90° C.; (c) removing the Cd; (d) stripping the extractant and separating metallic Cd therefrom; (e) converting Fe-ions into (solid) Fe hydroxide and filtering; (f) recovering Ni from the filtrate.

4 Claims, No Drawings

RECOVERY OF CD AND NI FROM BATTERIES

The invention relates to a method for recovering cadmium (Cd) and nickel (Ni) from batteries, containing the following process steps:
a. reducing the size of the batteries to small pieces with linear sizes smaller than approximately 15 mm;
b. leaching out the fraction at approximately 90° C. with a strong acid, filtering and removing the residue;
c. removing the Cd from the leaching liquid with the aid of solvent extraction;
d. stripping the extractant loaded with Cd with a liquid and separating metallic Cd therefrom with the aid of electrolysis;
e. adjusting the acidity of the leaching liquid in such a manner, that iron $(Fe)^{++}$-ions are converted into solid $Fe^{+++}$ hydroxide, and filtering this off;
f. recovering Ni: metallic, or as Ni-hydroxide respectively, from the filtrate with the aid of electrolysis or by increasing the pH. Such a, so-called hydrometallurgical, method is known.

The Ni-Cd batteries concerned consist of approximately 16 weight % of Cd, of approximately 34 weight % of Ni, of approximately 23 weight % of Fe, and for the rest of plastic and paper.

The size reduction takes place with the aid of a knife-mill, equipped with a retaining screen. The contents of the batteries are thus laid bare. When leaching the conditions are chosen in such a manner that the maximum amount of Cd and Ni goes into solution. The choice of four independent parameters is concerned here, i.e.: the temperature, the ratio between the quantities of acid and solid material, the strength of the acid and the residence-time in the leaching barrel.

The solvent extraction of Cd can be achieved with the aid of various extractants, for example with tributyl phosphate or with a tertiary amine. After the Cd has been removed from the leaching liquid the conversion of $Fe^{++}$ into $Fe^{+++}$ therein can be achieved with the aid of hypochlorite and at a pH of approximately 4.

The aim of the method is twofold: on the one hand to prevent the dangerous Cd from ending up in the environment, on the other hand to be able to re-use the relatively expensive Cd and Ni. Re-chargeable batteries in particular contain much Ni and Cd. With the aid of this known process approximately 275 kg of metallic Ni and 150 kg of metallic Cd can be recovered from each 1000 kg of batteries. An important factor for applying such a process or not is especially also the economy of the process.

The aim of the invention is to improve the indicated economy of the process. The improvement according to the invention is, that after step 1) the small pieces are separated into a coarse fraction with linear sizes of more than approximately 3 mm, a fine fraction with linear sizes of less than 3 mm and that the coarse fraction is separated into a magnetic and a non-magnetic fraction.

The coarse, magnetic fraction—approximately 50% of the weight of the batteries—appears to be very Fe rich, while virtually all of the Cd and Ni is situated in the fine fraction together with only a few weight percent of Fe, from the coarse, magnetic fraction the Fe can be recovered.

By removing the Fe at the first stage in this way the economy of the leaching process can be improved: because there is little Fe in the leaching liquid—approximately a factor 5 less than in the event that no separation into coarse and fine fractions is made—the production of hydrogen gas is now much smaller—still approximately 25%—and only approximately 30% of the usual quantity of acid is now necessary. The emission of salt to water becomes proportionally smaller.

After removal of the residue—in the order of 1% of the fine fraction and containing some Cd and Ni—a leaching liquid remains, which contains proportionally more Cd, more Ni and less Fe than in the case that no prior separation was carried out.

A further advantage turns out to be the fact that approximately 30% less extraction liquid is required for the solvent extraction process.

A further improvement is obtained if, according to a further characteristic of the method according to the invention, the stripping of the loaded extract liquid takes places with the aid of a diluted strong acid. The stripping efficiency turned out to increase from approximately 85% approximately 100%.

Yet another improvement of the process is acquired if, at step c), metallic Fe powder is added in order to reduce any $Fe^{+++}$ which may be present. This prevents the Fe which is present from being extracted together with the Cd.

The invention will be explained further by a process according to the invention—after size reduction magnetic separation follows, plus sieving and stripping with the aid of a diluted acid—comparable with the process which has been customary up to now, without the said characteristics of the invention.

IMPLEMENTATION EXAMPLE 1

(Process According to the State of the Art Technology)

Nickel-cadmium batteries (composition: 15.8 weight % Cd, 33.9 weight % Ni, 22.5 weight % Fe) are reduced in size in a knife mill which is equipped with a 10 mm sieve. The reduced material is brought into contact during 1 hour, with intensive stirring, with 6N HCl at 90° C. The ratio: liquid/solid material is 10/1. With a filter press the solid material is, to the extent that it has not dissolved, separated from the leaching liquid. This residue is (in weight) approximately 10% of the original material and it consists for approximately 0.03 weight % of cadmium and 15 weight % of nickel (this means that the residue is chemical waste). The leaching liquid contains 15.5 g Cd/l 29.4 Ni/l, 20.3 g Fe/l and 4.0 eq $H^+/l$. With a set-up for continuous (counter-current) solvent extraction, which consists of three mixer-settler units, 99.1% of the cadmium is removed from the leaching liquid at room temperature. The extraction liquid is a mixture of 75 vol. % tributylphosphate (TBP) and 25% vol. % Shellsol R. Equal volumes of leaching liquid and extraction liquid are used (i.e. 0/A=1). Cadmium is stripped from the loaded TBP=in a mixer-settler unit with demineralised water (0/A=1, room temperature); the stripping efficiency amounts to 87%. The stripping liquid is circulated through an electrolysis reactor, in which, at a constant cell voltage of approximately 2.4 volt, metallic cadmium is deposited at a flat cathode of graphite. The electrolysis is terminated when the cadmium concentrate in the stripping liquid has dropped to 0.06 g/l. The (integral) current efficiency amounts to approximately 50%. After the solvent extraction the acidity of the leaching liquid, from which the cadmium has been removed, is set at pH=4 with NaOH and an excess of hypochlorite is added. As a result of this treatment the Fe++-ions are turned into solid Fe+++ hydroxide, which is filtered off. The filtrate is recirculated through an electrolysis reactor, in which, at a constant voltage of approximately 2.3 volt, metallic nickel is deposited at a flat cathode of graphite. The electrolysis is terminated at a nickel concentration of 1 mg/l. The (integral) current efficiency amounts to approximately 75%.

IMPLEMENTATION EXAMPLE 2

Nickel-cadmium batteries (composition as in implementation example 1) are reduced in size in a knife mill which is equipped with a 15 mm sieve. By means of a combination of magnetic separation and sieves the material which has been reduced in size is fractioned; as a result a coarse iron-rich scrap fraction (45 weight % of the batteries), a coarse non-magnetic fraction (19 weight %) and a fine fraction (36 weight % of the batteries) which is rich in cadmium are obtained. Both of the coarse fractions are rinsed at a relatively low temperature (20°–50° C.) with 6N HCl; under these conditions hardly any iron goes into solution. The fine (<3 mm) material (27.4% Cd, 36.9% Ni, 3.8% Fe) is leached at 90° C. during a period of 1.5 hours with intense stirring in the hydrochloric acid used for rinsing the coarse fractions. Because the quantity of metallic iron which has dissolved during the leaching has decreased by a factor of 5 in comparison with implementation example 1, the production of hydrogen gas is now much lower (namely approximately 25% of the quantity according to implementation example 1). The ratio: liquid/solid material is 10/1. As in this example only 36% of the quantity of acid from implementation example 1 is required, the salt problem is decreased proportionally. With a filter press the solid material is separated from the leaching liquid, to the extent that it has not gone into solution. The quantity of residue amounts to approximately 1% of the weight of the (original) fine fraction. On the basis of the contents of cadmium and nickel—7% and 22% respectively—this residue is a chemical waste product. The leaching liquid contains 26.0 g Cd/l, 37.5 g Ni/l, 4.2 g Fe/l and 4 eq H+/l. With a set-up for continuous (counter-current) solvent/extraction, consisting of 3 mixer-settler units, 99.6% of the cadmium is removed from the leaching liquid at room temperature. The extraction liquid is a mixture of 75 vol. % TBP and 25 vol. % Shellsol R. The O/A ration is 1.5. Cadmium is almost completely stripped from the loaded TBP (stripping efficiency>99%) in two mixer settler units with 0.1N HCl (O/A=1.5, room temperature). The stripping liquid contains, besides more than 99.5% of the leached-out cadmium, approximately 9% of the iron and less than 1% of the nickel which was present in the leaching liquid. The stripping liquid is recirculated through a reactor in which metallic cadmium is separated by electrolysis at a flat cathode of graphite. The electrolysis is terminated when the cadmium concentration in the stripping liquid has dropped to a few tens of mg/l. The (integral) current efficiency amounts to approximately 50%. The purity of the separated metallic cadmium is 99.7%. After the solvent extraction the acidity of the leaching liquid from which the cadmium has been removed is set at pH=4 with NaOH and an excess of hypochlorite is added. As a result of this treatment the Fe++-ions are turned into solid Fe+++ hydroxide, which is filtered off. The filtrate is recirculated through an electrolysis reactor, in which, at a constant voltage of approximately 2.3 volt, metallic nickel is deposited at a flat cathode of graphite. The electrolysis is terminated at a nickel concentration of 1 mg/l. The (integral) current efficiency amounts to approximately 75%.

It has turned out that the acid consumption is lower for a higher cadmium and nickel concentration in the leaching liquid.

I claim:

1. A method for recovering cadmium (Cd), nickel (Ni) and iron (Fe) from (NiCd) batteries containing cadmium, nickel and iron, comprising the following steps:

reducing the size of the batteries to pieces having linear sizes of approximately 15 mm or less;

fractioning said pieces by sieves and magnetic means into (a) a fine fraction having a linear size not more than 3 mm consisting of predominantly cadmium and nickel with some iron and (b) a coarse fraction with a linear size of more than approximately 3 mm comprising a magnetic fraction consisting of predominantly iron with some cadmium and nickel and a non-magnetic fraction consisting of predominantly cadmium and nickel with some iron;

contacting said fine fraction at approximately 90° C. with an acid of sufficient strength to leach out the cadmium, nickel and iron from said fine fraction to produce a liquid comprising ions of cadmium, nickel and iron including Fe++ ions and to produce a solid residue portion comprising cadmium and nickel;

filtering and removing said solid residue portion from said liquid containing said ions;

removing cadmium from said liquid containing said ions by extraction to produce an extracted liquid;

stripping cadmium from said extracted liquid using electrolysis means to separate metallic cadmium therefrom, thereby forming a substantially cadmium free extracted liquid; then removing said iron from said cadmium free extracted liquid including converting said iron (Fe)++ ions into solid (Fe)+++ hydroxide by adding NaOH and an excess of hypochlorite to said liquid to adjust the acidity (pH) of the cadmium free extracted liquid remaining after electrolysis, and filtering said solid (Fe)+++ hydroxide from said liquid to result in a filtrate containing nickel; and recovering metallic nickel or nickel hydroxide from said liquid filtrate by subjecting said filtrate containing nickel to electrolysis.

2. The method according to claim 1 wherein the step of stripping includes the step of adding a diluted acid to said substantially cadmium free extracted liquid.

3. The method according to claims 1 or 2 further comprising the step of adding metallic iron (Fe) powder to said extracted liquid containing said ions.

4. A method for recovering cadmium (Cd), nickel (Ni) and iron (Fe) from (NiCd) batteries containing cadmium, nickel and iron, comprising the following steps:

reducing the size of the batteries to pieces having linear sizes of approximately 15 mm or less;

fractioning said pieces by sieves and magnetic means into (a) a fine fraction having a linear size not more than 3 mm consisting of predominantly cadmium and nickel with some iron and (b) a coarse fraction with a linear size of more than approximately 3 mm comprising a magnetic fraction consisting of predominantly iron with some cadmium and nickel, and a non-magnetic fraction consisting of predominantly cadmium and nickel with some iron;

contacting said fine fraction at approximately 90° C. with a acid of sufficient strength to leach out the cadmium, nickel and iron from said fine fraction to produce a liquid comprising ions of cadmium, nickel and iron including $Fe^{++}$ ions to produce a solid residue portion comprising cadmium and nickel;

filtering and removing said solid residue portion from said liquid containing said ions;

removing cadmium from said liquid by extraction to produce an extracted liquid;

stripping cadmium from said extracted liquid using electrolysis means to separate metallic cadmium therefrom; then removing said iron from said extracted liquid including converting said iron $(Fe)^{++}$ ions into solid $(Fe)^{+++}$ hydroxide by adding NaOH and an excess of hypochlorite to said liquid to adjust the acidity (pH) of the extracted liquid remaining after electrolysis, and filtering said $(Fe)^{+++}$ hydroxide from said extracted liquid to result in a filtrate containing metallic nickel and nickel hydroxide; and recovering metallic nickel or nickel hydroxide from said liquid filtrate by increasing the pH of said liquid remaining.

* * * * *